(12) United States Patent
Pinkard et al.

(10) Patent No.: US 12,466,285 B2
(45) Date of Patent: Nov. 11, 2025

(54) PORTABLE POWER SYSTEM DOCKING ASSEMBLY

(71) Applicant: Redarc Technologies Pty Ltd, Morphett Vale (AU)

(72) Inventors: Dylan Llewellyn Pinkard, Reynella (AU); James Albrechtsen, Reynella (AU)

(73) Assignee: Redarc Technologies Pty Ltd, Lonsdale (AU)

( * ) Notice: Subject to any disclaimer, the term of this patent is extended or adjusted under 35 U.S.C. 154(b) by 368 days.

(21) Appl. No.: 18/011,375

(22) PCT Filed: Jun. 25, 2021

(86) PCT No.: PCT/AU2021/050666
§ 371 (c)(1),
(2) Date: Dec. 19, 2022

(87) PCT Pub. No.: WO2021/258153
PCT Pub. Date: Dec. 30, 2021

(65) Prior Publication Data
US 2023/0234469 A1   Jul. 27, 2023

(30) Foreign Application Priority Data

Jun. 26, 2020 (AU) .............................. 2020902139

(51) Int. Cl.
*B60L 53/80* (2019.01)
*H01M 50/249* (2021.01)
*H01R 13/629* (2006.01)

(52) U.S. Cl.
CPC ........... *B60L 53/80* (2019.02); *H01M 50/249* (2021.01); *H01R 13/62938* (2013.01)

(58) Field of Classification Search
CPC .............. B60L 2200/18; B60L 2200/24; B60L 2200/28; B60L 2200/36; B60L 2200/40;
(Continued)

(56) References Cited

U.S. PATENT DOCUMENTS 2,609,268 A    9/1952 Nye
5,504,991 A *  4/1996 Parmley, Sr. ........... B60L 53/30
                                                  320/109
(Continued)

FOREIGN PATENT DOCUMENTS

CN    102 084 555 A     6/2011
EP     2 672 573 B1    12/2016
WO   WO-2015/092774 A2  6/2015

OTHER PUBLICATIONS

Supplementary European Search Report for Application No. 21828845.4 dated Jun. 26, 2024.
(Continued)

*Primary Examiner* — James M Dolak
(74) *Attorney, Agent, or Firm* — MARSHALL, GERSTEIN & BORUN LLP; Michael P. Furmanek

(57) ABSTRACT

A portable power system assembly that includes a portable power system (PPS) and a dock. The dock is mountable to a vehicle and includes a PPS holding tray and an actuator arm, with the actuator arm capable of being pivoted from a first position to a second position, the holding tray including a PPS receiving station and a PPS securing station, and the securing station including electrical supply terminals. The PPS includes a housing with opposing ends, there being mating electrical terminals at one end and at least one abutment region at the other end for engagement with the actuator arm. The actuator arm engages with the abutment region of a PPS in the receiving station to move, during pivoting of the actuator arm from its first position to its second position, the PPS from the receiving station to the
(Continued)

securing station for mating electrical engagement of the PPS and dock electrical terminals, and, in its second position, the actuator arm engages with the PPS in the securing station to releasably lock the PPS in the securing station.

13 Claims, 4 Drawing Sheets

(58) Field of Classification Search
CPC .... B60P 7/15; B60P 7/135; B60P 7/06; B60P 7/00; B60R 11/00; B60R 2011/0075; B60R 2011/0064; B60R 2011/0049; B60R 2011/0042; H05K 5/069; H05K 5/0204; H05K 5/06; H05K 5/00; H05K 5/02; H05K 5/0208; H02J 7/0044; H02J 7/14; H02J 7/1438; H02J 7/0042; H02J 7/0045; H01R 13/62938; H01R 13/62933; H01R 13/629; H01R 13/62; H01R 13/00; H01M 50/249; H01M 50/20; H01M 50/00

See application file for complete search history.

(56) References Cited

U.S. PATENT DOCUMENTS

| | | | | |
|---|---|---|---|---|
| 5,633,095 | A * | 5/1997 | Ishikawa | B62K 19/36 |
| | | | | 429/96 |
| 5,937,623 | A | 8/1999 | Wolf | |
| 6,140,798 | A | 10/2000 | Krieger | |
| 7,413,045 | B2 * | 8/2008 | Tien | B60R 16/04 |
| | | | | 429/96 |
| 7,815,448 | B2 * | 10/2010 | Kawai | H01R 31/08 |
| | | | | 439/157 |
| 8,414,315 | B2 * | 4/2013 | Dekoski | H01R 13/62938 |
| | | | | 439/157 |
| 8,653,786 | B2 * | 2/2014 | Baetica | H01M 50/262 |
| | | | | 56/11.9 |
| 9,070,923 | B2 * | 6/2015 | Yu | H01M 50/249 |
| 9,277,687 | B2 * | 3/2016 | Marcil | A01B 33/082 |
| 9,346,421 | B2 * | 5/2016 | Miyashiro | H01M 50/271 |
| 9,358,895 | B2 * | 6/2016 | Avganim | B60K 1/04 |
| 11,102,928 | B2 * | 8/2021 | Uemura | B60K 1/04 |
| 11,485,212 | B2 * | 11/2022 | Ito | B60R 16/0207 |
| 11,613,182 | B2 * | 3/2023 | Clark | H01M 50/20 |
| | | | | 180/68.5 |
| 11,667,181 | B2 * | 6/2023 | Fan | A01D 34/64 |
| | | | | 180/68.5 |
| 11,817,731 | B2 * | 11/2023 | Zeiler | B25F 5/02 |
| 11,958,379 | B2 * | 4/2024 | Zhang | B66F 9/122 |
| 12,263,752 | B2 * | 4/2025 | Falls | B60L 50/64 |
| 12,286,005 | B2 * | 4/2025 | Hörder | B60L 58/16 |
| 12,286,028 | B2 * | 4/2025 | Janku | B60S 5/06 |
| 12,351,061 | B2 * | 7/2025 | Zhang | B60K 1/04 |
| 2009/0101422 | A1 * | 4/2009 | Subramanian | B60K 6/48 |
| | | | | 296/187.01 |
| 2009/0266042 | A1 * | 10/2009 | Mooney | B60L 50/52 |
| | | | | 56/14.7 |
| 2010/0275564 | A1 | 11/2010 | Baetica et al. | |
| 2012/0326107 | A1 * | 12/2012 | Ojima | B60K 1/04 |
| | | | | 254/89 R |

OTHER PUBLICATIONS

International Search Report and Written Opinion issued to PCT/AU2021/050666, dated Aug. 17, 2021.

* cited by examiner

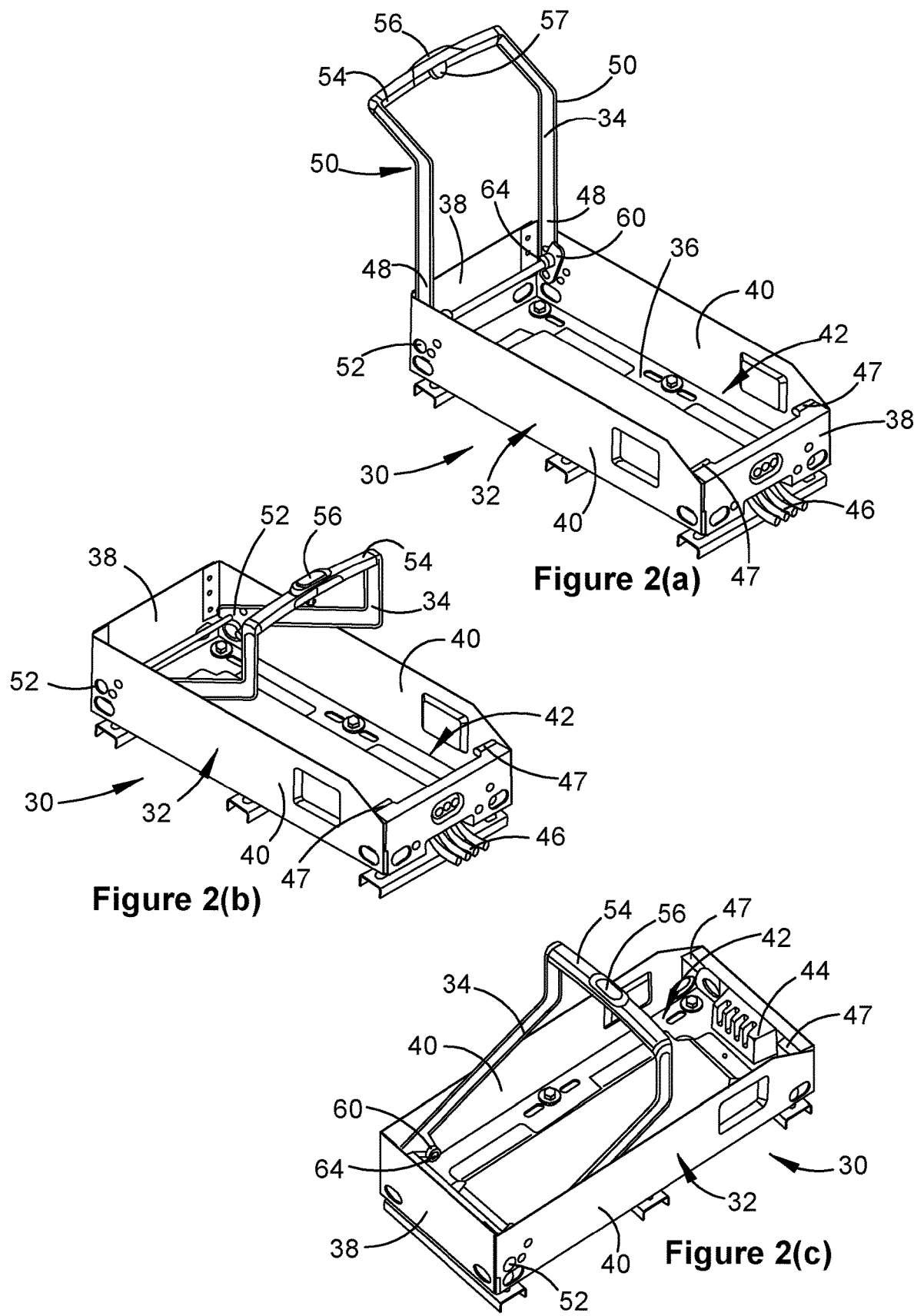

PORTABLE POWER SYSTEM DOCKING ASSEMBLY

RELATED APPLICATION

This is the United States national phase of International Patent Application No. PCT/AU2021/050666, filed 25 Jun. 2021, which claims priority to Australian provisional patent application 2020902139 filed on 26 Jun. 2020. The entire contents of each of which are incorporated herein by reference.

FIELD OF THE INVENTION

The present invention relates to an assembly for the releasable securing of a portable power system, typically in a vehicle, so that the portable power system can be safely and securely transported in the vehicle with an electrical connection to the vehicle, permitting at least charging of the portable power system, and then be readily disconnected and removed from the vehicle when power is needed away from the vehicle.

The vehicle might be a passenger vehicle, an off-road vehicle, a truck, a work utility vehicle, an RV, a trailer, a camper trailer, or a caravan or the like, and the portable power system might be used, for example, for remote activities such as camping, outdoor adventuring or touring, or for building or construction, or other outdoor or remote activities that require a portable supply of power.

BACKGROUND OF THE INVENTION

With the bulk, noise and fumes generated by traditional electrical generators being regarded as generally undesirable by most off-road enthusiasts, equipping off-road vehicles with dual battery systems has developed as a technique for keeping devices and appliances charged during travel, and for use as a source of remote power as camping and touring equipment has become more power-hungry. However, dual battery systems often are not enough for more than one or two nights of travel, do not provide users with enough flexibility, and are not readily able to be used away from the vehicle.

Portable power systems (PPS) have thus been developed to provide readily transportable power supplies, in particular (but certainly not exclusively) for off-road use. Such a PPS can take many forms and have many features. For example, a PPS (which might sometimes be referred to simply as a battery box or a power pack) might include an AC inverter with multi-stage surge capability, permitting its use with multiple appliances such as fridges, lights, laptops or power tools. A 40 amp/hour lithium battery powered model might be in a rectangular housing about 45 cm long by 25 cm wide and about 30 cm high, and weigh up to 8 or 10 kilograms, but might be able to power a 40 L camping for fridge for up to 40 hours on a single charge, powered up to 400 Wh. Such units may also feature replaceable batteries, information displays and AC, USB and/or 12V outputs. A more powerful PPS is likely to be heavier and bulkier.

A PPS has thus become an item needing safe and secure transport, often in the rear of an off-road vehicle, and often in the same space that is occupied by passengers. Additionally, with most such portable power systems including rechargeable batteries, such secure transport generally also needs to permit appropriate electrical connection to the vehicle to permit re-charging during travel.

It is an aim of the present invention to provide an improved assembly for the mechanical and electrical docking of a PPS in a vehicle in a secure manner during travel, that also permits easy disengagement and removal of the PPS from the vehicle when power is required away from the vehicle.

Before turning to a summary of the present invention, it must be appreciated that any description of prior art is provided merely as background to explain the context of the invention. It is not to be taken as an admission that any of the material referred to was published or known or was a part of the common general knowledge in Australia or elsewhere.

SUMMARY OF INVENTION

The present invention provides a portable power system assembly that includes a portable power system (PPS) and a dock, wherein:

the dock is mountable to a vehicle and includes a PPS holding tray and an actuator arm, the actuator arm capable of being pivoted from a first position to a second position, and the holding tray including a PPS receiving station and a PPS securing station, with the securing station including electrical supply terminals; and the PPS includes a housing with opposing ends, there being mating electrical terminals at one end and at least one abutment region at the other end for engagement with the actuator arm;

whereby the actuator arm engages with the abutment region of a PPS in the receiving station to move, during pivoting of the actuator arm from its first position to its second position, the PPS from the receiving station to the securing station for mating electrical engagement of the PPS and dock electrical terminals, and, in its second position, the actuator arm engages with the PPS in the securing station to releasably lock the PPS in the securing station.

A portable power system (PPS) suitable for use with the assembly of the present invention may be any type of PPS that includes a housing, generally a rectangular or box-shaped housing, with opposing ends, electrical terminals at one end and at least one abutment region at the other end. Indeed, it should be appreciated that the assembly of the present invention will be usable with any type of portable unit that might either require power or provide power (or both). The reference to a PPS throughout this specification, including the claims, should thus be regarded as including a unit such as a portable fridge, which requires power for its own operation and includes its own rechargeable battery for its own use, but which does not include any other features that might be usable with or for other units, and thus is not likely to be used as a source of power for other units.

The assembly of the present invention may be used to transport a PPS in the rear of a vehicle, such as a 4WD vehicle when touring for a camping trip. The PPS holding tray of the dock may be mounted in the rear of the cargo space, for example, of the vehicle to securely retain the dock in place in the vehicle, following which a suitable PPS may be placed in the PPS receiving station of the holding tray.

The actuator arm may then be operated to move from its first position to its second position, in doing so moving the PPS along the holding tray from the receiving station to the securing station, where the electrical terminals of the PPS mate with the electrical terminals of the holding tray, preferably both mechanically and electrically.

In its second position, the actuator arm may then be engaged with the PPS in the securing station to releasably lock the PPS in the securing station, and thus securely mount the PPS in the rear of the vehicle during travel whilst electrically connected to the vehicle power supply for the purposes of either charging the PPS or operating the PPS, as necessary.

Upon arrival at a destination, the disengagement of the actuator arm from the PPS permits the PPS to be manually moved away from the securing station and lifted from the holding tray, for easy removal from the vehicle when power is required away from the vehicle or when a particular PPS unit (for example, a camping fridge) is required for use away from the vehicle.

Turning now to a description of various preferred embodiments of the portable power system assembly of the present invention, and specifically with reference to the dock, the actuator arm is preferably a lever with a free end. The arm preferably has a fulcrum at its other end where the arm is pivotally attached to the holding tray, preferably at one end of the holding tray (and the receiving station). The arm preferably includes a projection at or near its fulcrum for engagement with the abutment portion of a PPS for creation of the PPS movement described above as the actuator arm pivots about is fulcrum from its first position to its second position.

In one preferred form of the invention, the actuator arm includes a releasable locking member, such as a spring-loaded latch, at or near its free end capable of releasably engaging with, when the arm is in its second position, a corresponding latch striker or the like on the PPS to provide the releasable locking of the PPS in the securing station. In this respect, ideally the arm's first position will have the arm standing upright, generally perpendicular to the dock's holding tray, with the free end uppermost and the arm not being an obstacle to the PPS being positioned in the holding tray's receiving station.

The arm's second position, after the arm has been pivoted from the first position to move the PPS into the securing station, is preferably inclined towards the end of the holding tray that has the electrical terminals. In that second position, or as the arm is completing its movement into that second position, the arm will preferably be positioned so that the releasable locking member is closely adjacent the PPS where it can engage with the PPS.

In another preferred form of the invention, the actuator arm is U-shaped, with the two ends of the legs of the U being the ends that are pivotally secured at a fulcrum (each) to the holding tray, again preferably at one end of the holding tray (and the receiving station). The U is then, in use, inverted so that the base portion of the U is essentially the "free end" of the actuator arm. This shape of actuator arm is advantageous in that the releasable locking member can then be positioned centrally along the base portion of the U, and the U may be sized so that, in its second position, the actuator arm fits snugly over the PPS housing, permitting the releasable locking member to easily engage with a centrally positioned latch on the top of the PPS housing. In this position, with a U-shaped actuator arm, the configuration of the arm itself assists with the securing of the PPS in the dock.

In this respect, the releasable locking member may be any suitable type of locking member and the PPS will include any suitable type of complementary member for engagement with the locking member. The locking member will ideally be such that it permits engagement between the actuator arm and the PPS simply by urging the two together, such as would be provided by a slam (or spring) latch in the actuator arm engaging with a suitably located striker plate formed in the housing of the PPS. A slam latch (sometimes referred to as a "push-to-close" latch) is typically spring loaded and rests in its locked position, requiring a specific manual operation against the spring to unlock the arm, but only needing minor pressure by a user urging the arm against the PPS to automatically lock the arm in place.

In one specific form, the releasable locking member is a spring-loaded latching mechanism that automatically opens upon closure of the actuator arm (in its second position). In this form, the latching mechanism is ideally unable to disengage without a user pressing a release button on the actuator arm.

In a preferred form, the housing of a PPS is adapted to include a suitable type of complementary member for engagement with the preferred releasable locking member of the actuator arm of the holding tray. Such a complementary engagement member may be positioned on a side of the housing adjacent where the free end of an actuator arm might rest when in its second position, permitting releasable engagement between the releasable locking member and the complementary member when the PPS is in the securing station. In one form, where the releasable locking member is, for example, a slam (or spring) latch, the complementary member will be a suitable striker plate integral with or secured to the housing of the PPS.

In an alternative form, when the actuator arm is U-shaped, with the base portion of the U the "free end" of the actuator arm and the releasable locking member positioned centrally along the base portion of the U, the complementary engagement member would be positioned centrally in the upper wall of the housing.

As mentioned above, the actuator arm engages with an abutment region (or more than one abutment region) of a PPS in the receiving station of the holding tray, during pivoting of the actuator arm from its first position to its second position, to move the PPS from the receiving station to the securing station. In a preferred form of the invention, the arm includes a projection at or near its fulcrum for engagement with the abutment portion(s) of a PPS, or where the arm is U-shaped, two projections, one each at or near each fulcrum. Such projections extend from the arm towards the securing station end of the holding tray, and preferably slightly inwardly to be capable of engaging with one end of a PPS seated in the receiving station of the holding tray.

Preferably, the projection itself simply acts as an abutment configured and positioned on the arm to come into contact with one end of the PPS as the pivoting movement of the arm commences, and to then continue being urged against the PPS, and move the PPS along the holding tray, as the pivoting movement of the arm continues. Preferably, each projection includes at its free end a roller bearing or bushing or the like to smooth the engagement between the actuator arm and the PPS, and to assist with the relative motion between the pivoting actuator arm and the subsequent linear motion of the PPS in the holding tray.

In relation to the abutment region(s) of the PPS, rather than such a region simply being defined by that area of the PPS housing where the projection of the actuator arm makes contact, in a preferred form the PPS housing will be adapted to include a specially configured abutment region. In one form, a PPS abutment region will be formed in a portion of the PPS housing that is adjacent to the projection of the actuator arm when the PPS is in the receiving station, which will preferably be a lower portion of the housing near one corner at the receiving station end of the housing. In this form, the housing may include an arcuate roller groove able to receive roller bushings or the like provided at the free end of the projection to assist with converting the rotational force provided by the pivoting actuator arm into a linear force to move the PPS along the holding tray from the receiving station to the securing station.

In a further preferred form of the invention, the PPS holding tray includes a floor with upstanding end walls and side walls, forming therewithin a region for the PPS that includes the PPS receiving station at one end, overlapped with the PPS securing station at the other end. In this respect, the overlap between the two stations of the PPS region will generally be quite substantial given a preference for there to be only a small amount of linear movement for the PPS from the receiving station to the securing station.

The floor of the holding tray may include suitable guide rails or fittings for receiving and moving the PPS, which may or may not be configured to interact with complementary rails or fittings on the underside of the PPS housing. Indeed, such rails and fittings may additionally be adapted to include slidably engaging features to assist in securing the PPS to the holding tray (and thus to the dock) once the PPS is moved into the securing station, the slidably engaging features providing a mechanical connection between the PPS and the dock, and thus acting to prevent the PPS from being lifted up off the holding tray when in the securing position, but not of course preventing the PPS from being moved (slid) out of the securing station when the PPS is ready for removal from the dock.

The holding tray also includes electrical supply terminals in its securing station, capable of mating with electrical terminals provided in the end of the PPS housing. The electrical terminals of the holding tray are able to be electrically connected to another power supply, such as the vehicle in which the PPS assembly is being used, such that when the PPS is held in the securing station of the dock, with its electrical terminals connected to the dock's terminals, the PPS is able to be powered. Preferably the mating electrical terminals will be configured to provide not only an electrical connection, but also at least some degree of mechanical connection, at least insofar as movement of the PPS up and away from the floor of the holding tray is concerned.

It will thus be appreciated that the present invention also provides a portable power system (PPS) for use, and/or when used, with a dock in a portable power system assembly, wherein:

the dock is mountable to a vehicle and includes a PPS holding tray and an actuator arm, the actuator arm capable of being pivoted from a first position to a second position, and the holding tray including a PPS receiving station and a PPS securing station, with the securing station including electrical supply terminals; and the PPS includes a housing with opposing ends, the housing adapted to include mating electrical terminals at one end and at least one abutment region at the other end for engagement with the actuator arm;

whereby the actuator arm engages with the abutment region of a PPS in the receiving station to move, during pivoting of the actuator arm from its first position to its second position, the PPS from the receiving station to the securing station for mating electrical engagement of the PPS and dock electrical terminals, and, in its second position, the actuator arm engages with the PPS in the securing station to releasably lock the PPS in the securing station.

The present invention provides a dock for use, and/or when used, with a portable power system assembly for a portable power system (PPS), wherein:

the dock is mountable to a vehicle and includes a PPS holding tray and an actuator arm, the actuator arm capable of being pivoted from a first position to a second position, and the holding tray including a PPS receiving station and a PPS securing station, with the securing station including electrical supply terminals; and the PPS includes a housing with opposing ends, the housing including mating electrical terminals at one end and at least one abutment region at the other end for engagement with the actuator arm of the dock;

whereby the actuator arm engages with the abutment region of a PPS in the receiving station to, during pivoting of the actuator arm from its first position to its second position, move the PPS from the receiving station to the securing station for mating electrical engagement of the PPS and dock electrical terminals, and, in its second position, the actuator arm engages with the PPS in the securing station to releasably lock the PPS in the securing station.

BRIEF DESCRIPTION OF DRAWINGS

Having briefly described the general concepts involved with the present invention, a preferred embodiment of the present invention will now be described. However, it is to be understood that the following description is not to limit the generality of the above description.

In the drawings:

FIGS. 2a, 2b and 2c are perspective views of a dock in accordance with a preferred embodiment of the present invention, the views being of the dock with its actuator arm in its first position (FIG. 2a) and in its second position (FIG. 2b looking towards the receiving station—FIG. 2c looking towards the securing station);

FIG. 4 is an exploded view of the abutment region of the PPS in the position illustrated in FIG. 3a.

DETAILED DESCRIPTION OF PREFERRED EMBODIMENT

Figure 1A:
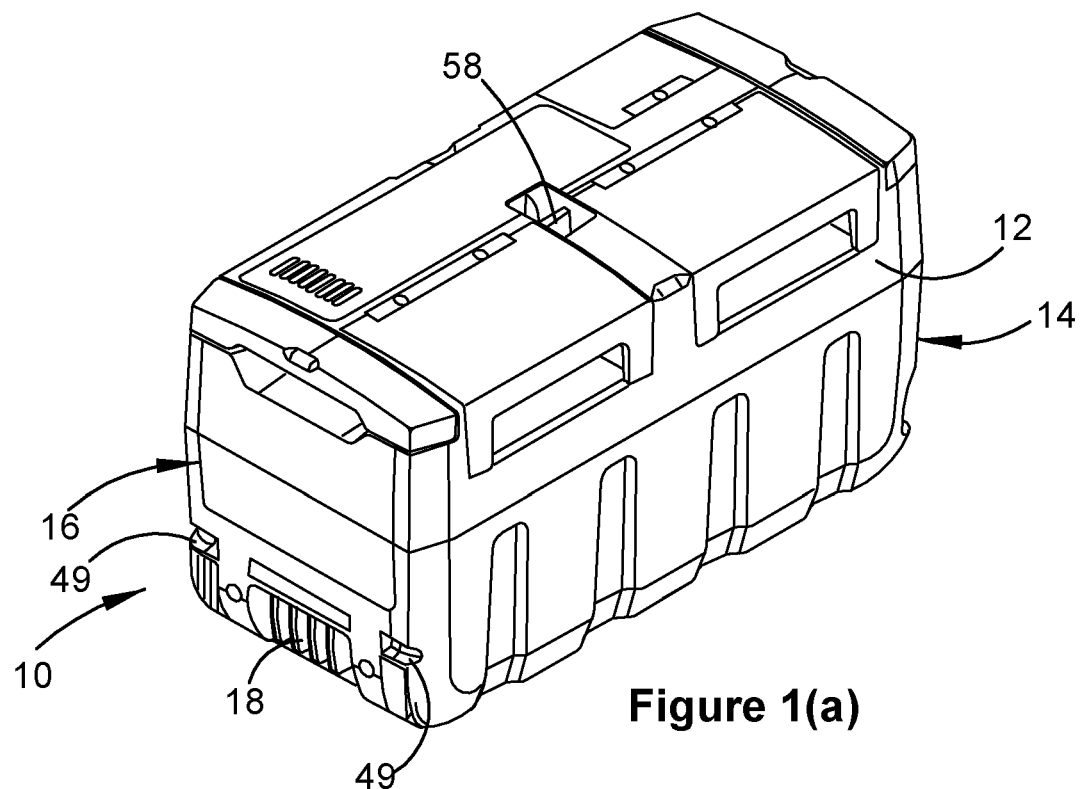
FIGS. 1a and 1b are perspective views from above of one end and of the other end (respectively) of a portable power system (PPS) in accordance with a preferred embodiment of the present invention.
Figure 1B:
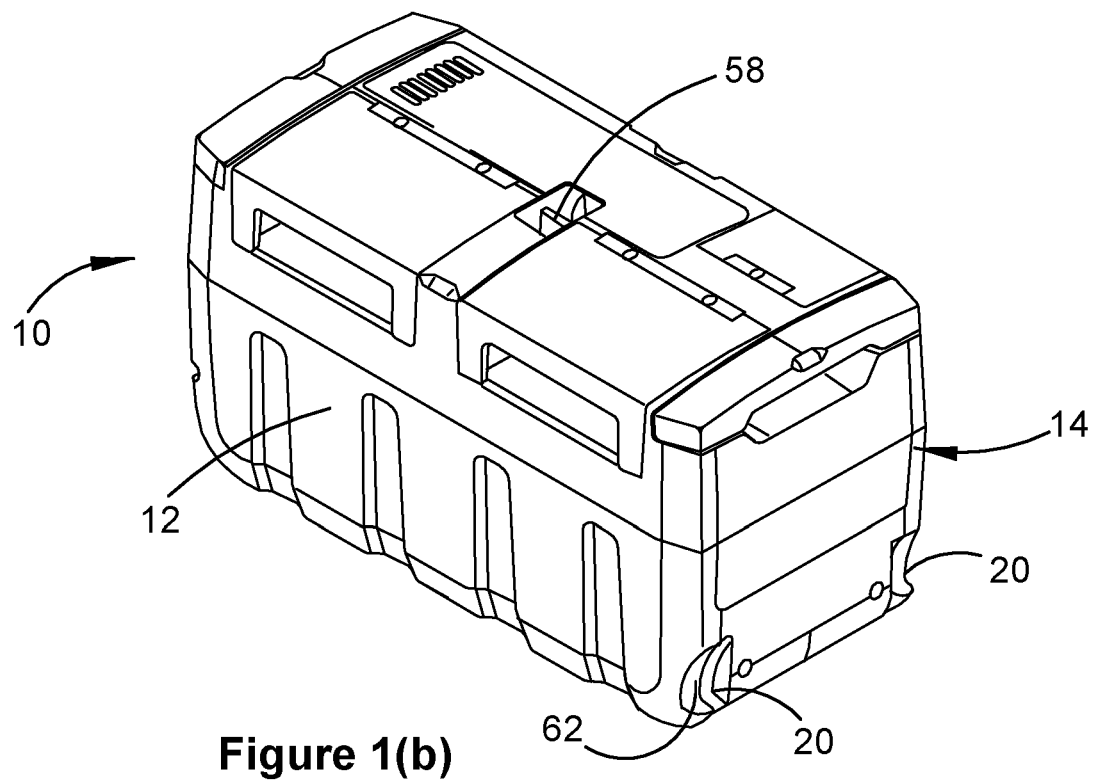

A portable power system 10 (PPS) suitable for use with the assembly of the present invention is illustrated in FIGS. 1a and 1b. As mentioned above, the PPS 10 may be any type of PPS and has a housing 12, in this embodiment a generally rectangular housing, with opposing ends 14,16, electrical terminals 18 at one end 16 and, in this embodiment, two abutment regions 20 at the other end 14.

Figure 3A:
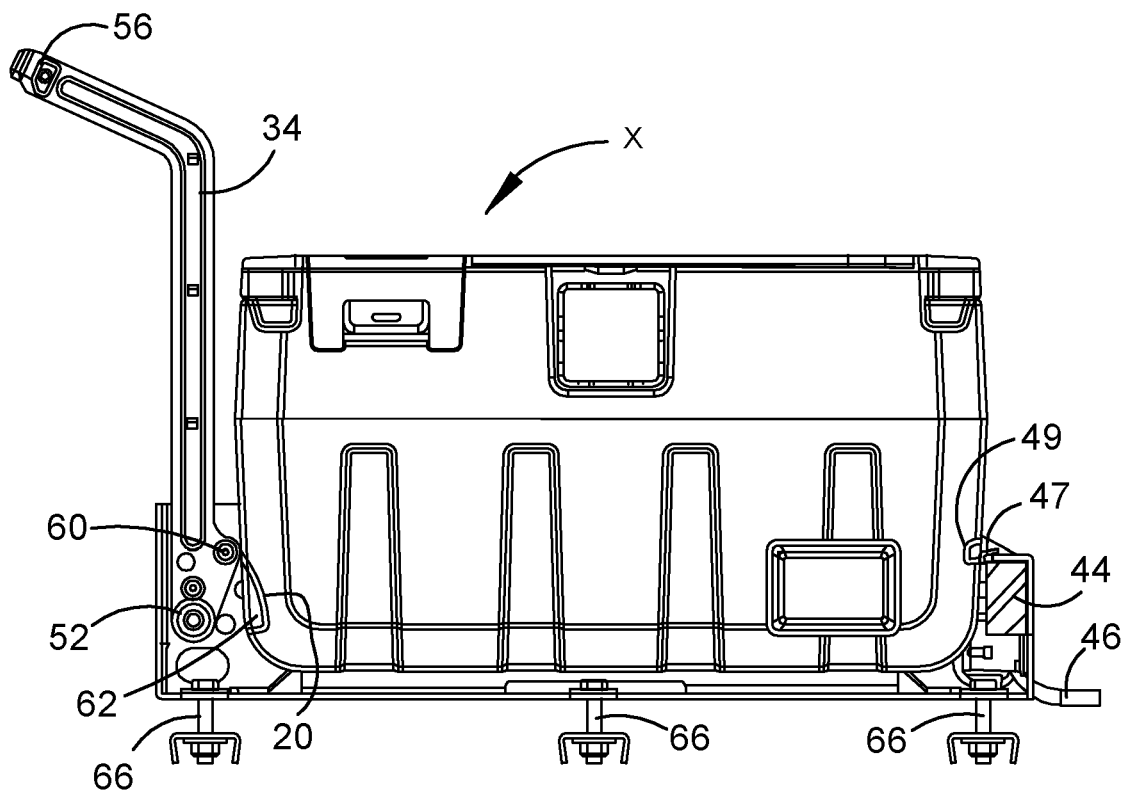
FIGS. 3a and 3b are side views of a portable power system assembly in accordance with a preferred embodiment of the present invention, showing a PPS in a dock's receiving station with its actuator arm in its first position (FIG. 3a) and the PPS moved to the securing station with the actuator arm in its second position (FIG. 3b)

The abutment regions 20 are specially configured abutment regions, formed in portions of the housing 12 that are adjacent to the projections 60 of the actuator arm 34 (described below in relation to FIGS. 2a, 2b and 2c) when the PPS is in the receiving station X of the dock 30 (indicated generally as being towards the left end of the dock 30 in the drawing shown in FIG. 3a). Indeed, the specific form of the abutment regions 20 of this embodiment will be further described below with reference to FIG. 3a.

Figure 3B:
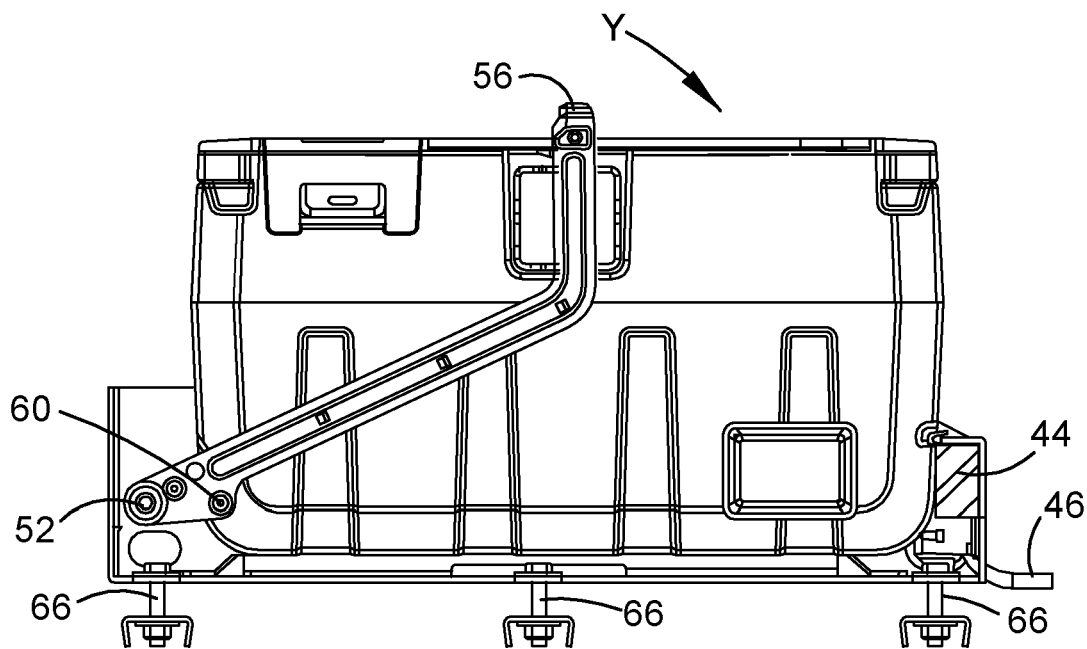

In relation to the dock 30 shown in FIGS. 2a, 2b and 2c, the dock 30 includes a holding tray 32 and an actuator arm 34, with the holding tray 32 including a floor 36 with upstanding end walls 38 and side walls 40, forming therewithin an inner region 42 for the PPS that includes the PPS receiving station X at one end of the dock 30 (see FIG. 3a), overlapped with a PPS securing station Y at the other end (indicated generally as being towards the right end of the dock 30 in the drawing shown in FIG. 3b). In this respect, the overlap between the two stations X and Y of the inner region 42 of the dock 30 is substantial given a preference for there to be only a small amount of linear movement for the PPS from the receiving station X to the securing station Y.

The holding tray 32 also includes electrical supply terminals 44 in its securing station Y, capable of mating with the electrical terminals 18 provided in the end 16 of the PPS housing 12. The electrical terminals 18 of the holding tray are able to be electrically connected to another power supply via cables 46, such as a vehicle in which the PPS assembly is being used, such that when the PPS is held in the securing station Y of the dock 30, with its electrical terminals 18 connected to the dock's terminals 44, the PPS is able to be powered.

The actuator arm 34 of the dock 30 is shown as a generally U-shaped (and inverted) lever with the two ends 48 of the legs 50 of the U being pivotally secured at a fulcrum 52 (each) to the holding tray 32, at one end of the holding tray 32 (being the receiving station X). The base portion 54 of the U is the "free end" of the actuator arm 34.

A releasable locking member 56 is positioned centrally along the base portion 54, and the legs 50 and the base portion 54 are sized so that, in its second position (see FIG. 2b), the actuator arm 34 fits snugly over the housing 12 (see FIG. 3b), permitting the releasable locking member 56 to easily engage with a centrally positioned latch 58 (see FIGS. 1a and 1b) on the top of the housing 12 of the PPS. In this position, with a U-shaped actuator arm 34, the configuration of the arm itself assists with the securing of the PPS in the dock 30.

The fulcrums 52 of the legs 50 of the actuator arm 34 are where the arm 34 is pivotally attached to the holding tray 32. Both legs 50 of the actuator arm 34 include a projection 60 at or near its fulcrum 52 for engagement with the respective abutment regions 20 of the PPS for creation of the PPS movement described above as the actuator arm 34 pivots about both fulcrums 52 from its first position (FIGS. 2a and 3a) to its second position (FIGS. 2b, 2c and 3b).

Partially visible in FIGS. 2a, 2b and 2c, the actuator arm 34 includes a releasable locking member 56 capable of releasably engaging with, when the arm 34 is in its second position (FIGS. 2b, 2c and 3b), a complementary member 58 on the PPS (see FIGS. 1a and 1b) to provide the releasable locking of the PPS in the securing station Y.

The releasable locking member 56 may be any suitable type of locking member and the complementary member 58 can thus also of course be any type of member suitable for engagement with the locking member 56. In this embodiment, the releasable locking member 56 is a spring-loaded latch 57 that automatically opens upon closure of the actuator arm 34 (in its second position). The latch 57 is unable to disengage from member 58 without a user pressing the release button on the actuator arm 34.

Figure 4:
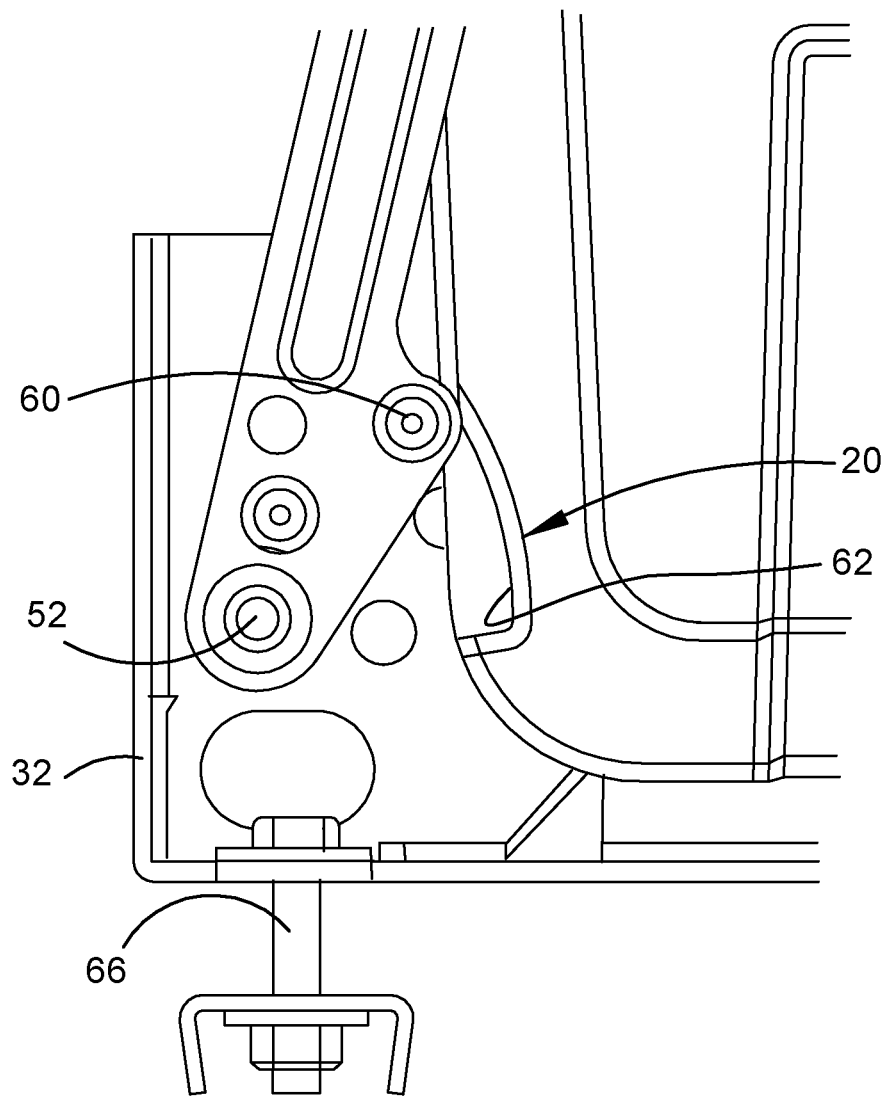

As mentioned above, the projections 60 of the actuator arm 34 engage with the abutment regions 20 during pivoting of the actuator arm 34 from its first position to its second position, to move the PPS from the receiving station X to the securing station Y. In this embodiment, and as can be seen in FIGS. 1b and 3a, and more closely in FIG. 4, the housing 12 includes arcuate roller grooves 62 able to receive roller bushings 64 (see FIGS. 2a and 2c) provided at the free ends of the projections 60 to assist with converting the rotational force provided by the pivoting actuator arm 34 into a linear force to move the PPS along the holding tray 32 from the receiving station X to the securing station Y. The roller bushings 64 smooth the engagement between the actuator arm 34 and the PPS and assist with the relative motion between the pivoting actuator arm 34 and the subsequent linear motion of the PPS in the holding tray 32.

Referring generally now to the assembly of a PPS 10 and a dock 30 shown in FIGS. 3a and 3b, the assembly of this embodiment may therefore be used to transport a PPS in the rear of a vehicle (not shown), such as a 4WD vehicle when touring for a camping trip. The holding tray 32 of the dock 30 may be mounted in the rear of the cargo space of the vehicle via mounting members 66 to securely retain the dock 30 in place in the vehicle, following which the PPS may be placed in the receiving station X of the holding tray 32.

The actuator arm 34 may then be operated to move from its first position (FIG. 3a) to its second position (FIG. 3b), in doing so moving the PPS along the holding tray 32 from the receiving station X to the securing station Y, where the electrical terminals 18 of the PPS mate with the electrical terminals 44 of the holding tray 32, both mechanically and electrically.

In relation to its mechanical connection, the end wall 38 of the tray 32, adjacent to the electrical terminals 44, can be seen in FIGS. 2a, 2b, 2c and 3a as having engagement projections 47 configured to be received by correspondingly shaped and positioned receiving portions 49 in the corners of the housing 12 of the PPS at its end 16. When the PPS moves into its securing station Y (FIG. 3b), the engagement projections 47 are captured by the receiving portions 49 to prevent movement of the PPS 10 up and away from the tray 32 and assist with mechanically securing the PPS in the securing station Y.

In its second position (FIG. 3b), the actuator arm 34 thus engages with the PPS in the securing station Y to releasably lock the PPS in the securing station Y, with both mechanical mating at both ends of the PPS and electrical mating at one end, and thus securely mount the PPS in the rear of the vehicle during travel whilst electrically connected to the vehicle power supply for the purposes of either charging the PPS or operating the PPS, as necessary.

Upon arrival at a destination, the disengagement of the actuator arm 34 from the PPS permits the PPS to be manually moved away from the securing station Y and lifted from the holding tray 32, for easy removal from the vehicle when power is required away from the vehicle or when a particular PPS unit (for example, a camping fridge) is required for use away from the vehicle.

A person skilled in the art will understand that there may be variations and modifications other than those specifically described. It is to be understood that the invention includes all such variations and modifications.

The invention claimed is:
1. A portable power system assembly that includes a portable power system (PPS) and a dock, wherein:
the dock includes a PPS holding tray and an actuator arm, the actuator arm capable of being pivoted from a first position to a second position, the holding tray including a PPS receiving station and a PPS securing station, with the securing station including electrical supply terminals; and the PPS includes a housing with opposing ends, there being mating electrical terminals at one end and at least one abutment region at the other end for engagement with the actuator arm;

whereby the actuator arm engages with the at least one abutment region of the PPS in the receiving station to move, during pivoting of the actuator arm from the first position to the second position, the PPS from the receiving station to the securing station for mating electrical engagement of the PPS and the electrical terminals of the dock, and, in the second position, the actuator arm engages with the PPS in the securing station to releasably lock the PPS in the securing station;

whereby the actuator arm includes a projection at a fulcrum of the actuator arm for engagement with the at least one abutment region of the PPS for creation of PPS movement from the receiving station to the securing station;

whereby the at least one abutment region is an arcuate roller groove able to receive a roller bearing or bushing provided at a free end of the projection to assist with converting rotational force provided by the pivoting actuator arm into a linear force to move the PPS from the receiving station to the securing station.

2. The portable power system assembly according to claim 1, wherein the holding tray includes a floor with upstanding end walls and side walls, forming therewithin an inner region for the PPS that includes the PPS receiving station at one end, overlapped with the PPS securing station at the other end.

3. The portable power system assembly according to claim 1, wherein the actuator arm is a U-shaped lever having a base portion and legs with free ends, the free ends of its legs being pivotally secured, each at a fulcrum, to the holding tray, at one end of the holding tray.

4. The portable power system assembly according to claim 3, wherein a releasable locking member is positioned centrally along the base portion for engagement with a centrally positioned complementary member on the housing of the PPS.

5. The portable power system assembly according to claim 4, wherein the legs and the base portion are sized so that, in its second position, the actuator arm fits snugly over the housing to assist in retaining the PPS in the securing station.

6. The portable power system assembly according to claim 1, wherein the PPS housing is a rectangular housing, with opposing ends, with its electrical terminals at one end and the abutment region at the other end.

7. A portable power system (PPS) for use, with a dock in a portable power system assembly, wherein:

the dock includes a PPS holding tray and an actuator arm, the actuator arm capable of being pivoted from a first position to a second position, and the holding tray including a PPS receiving station and a PPS securing station, with the securing station including electrical supply terminals; and the PPS includes a housing with opposing ends, the housing adapted to include mating electrical terminals at one end and at least one abutment region at the other end for engagement with the actuator arm;

whereby the actuator arm engages with the at least one abutment region of the PPS in the receiving station to move, during pivoting of the actuator arm from the first position to the second position, the PPS from the receiving station to the securing station for mating electrical engagement of the PPS and the electrical terminals of the dock, and, in the second position, the actuator arm engages with the PPS in the securing station to releasably lock the PPS in the securing station;

whereby the actuator arm includes a projection at a fulcrum of the actuator arm for engagement with the at least one abutment region of the PPS for creation of PPS movement from the receiving station to the securing station;

whereby the at least one abutment region is an arcuate roller groove able to receive a roller bearing or bushing provided at a free end of the projection to assist with converting rotational force provided by the pivoting actuator arm into a linear force to move the PPS from the receiving station to the securing station.

8. The portable power system assembly according to claim 7, wherein the PPS housing is a rectangular housing, with opposing ends, with its electrical terminals at one end and the abutment region at the other end.

9. A dock for use with a portable power system assembly for a portable power system (PPS), wherein:

the dock includes a PPS holding tray and an actuator arm, the actuator arm capable of being pivoted from a first position to a second position, and the holding tray including a PPS receiving station and a PPS securing station, with the securing station including electrical supply terminals; and the PPS includes a housing with opposing ends, the housing including mating electrical terminals at one end and at least one abutment region at the other end for engagement with the actuator arm of the dock;

whereby the actuator arm engages with the at least one abutment region of the PPS in the receiving station to, during pivoting of the actuator arm from the first position to the second position, move the PPS from the receiving station to the securing station for mating electrical engagement of the PPS and the electrical terminals of the dock, and, in the second position, the actuator arm engages with the PPS in the securing station to releasably lock the PPS in the securing station;

whereby the actuator arm includes a projection at a fulcrum of the actuator arm for engagement with the at least one abutment region of the PPS for creation of PPS movement from the receiving station to the securing station; whereby the at least one abutment region is an arcuate roller groove able to receive a roller bearing or bushing provided at a free end of the projection to assist with converting rotational force provided by the pivoting actuator arm into a linear force to move the PPS from the receiving station to the securing station.

10. The dock according to claim 9, wherein the holding tray includes a floor with upstanding end walls and side walls, forming therewithin an inner region for the PPS that includes the PPS receiving station at one end, overlapped with the PPS securing station at the other end.

11. The dock according to claim 9, wherein the actuator arm is a U-shaped lever having a base portion and legs with free ends, the free ends of its legs being pivotally secured, each at the fulcrum, to the holding tray, at one end of the holding tray.

12. The dock according to claim 11, wherein a releasable locking member is positioned centrally along the base portion for engagement with a centrally positioned complementary member on the housing of the PPS.

13. The dock according to claim 12, wherein the legs and the base portion are sized so that, in its second position, the actuator arm fits snugly over the housing to assist in retaining the PPS in the securing station.

* * * * *